US 8,514,777 B1

(12) United States Patent
Zhao (10) Patent No.: US 8,514,777 B1
(45) Date of Patent: Aug. 20, 2013

(54) METHOD AND APPARATUS FOR PROTECTING LOCATION PRIVACY OF A MOBILE DEVICE IN A WIRELESS COMMUNICATIONS NETWORK

(75) Inventor: Fan Zhao, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 272 days.

(21) Appl. No.: 12/607,668

(22) Filed: Oct. 28, 2009

Related U.S. Application Data (60) Provisional application No. 61/108,895, filed on Oct. 28, 2008.

(51) Int. Cl.
*H04W 4/00* (2009.01)

(52) U.S. Cl.
USPC .......................................................... 370/328

(58) Field of Classification Search
None
See application file for complete search history.

(56) References Cited

U.S. PATENT DOCUMENTS

| | | | | |
|---|---|---|---|---|
| 2003/0185198 | A1* | 10/2003 | Ishiyama et al. | 370/351 |
| 2005/0041675 | A1* | 2/2005 | Trostle et al. | 370/401 |
| 2007/0104202 | A1* | 5/2007 | Tariq et al. | 370/392 |
| 2008/0291885 | A1* | 11/2008 | Miao et al. | 370/338 |
| 2009/0213797 | A1* | 8/2009 | Li | 370/328 |

OTHER PUBLICATIONS

K. Mitsuya, R. Wakikawa, J. Murai, Implementation and Evaluation of Dual Stack Mobile IPv6, Proceedings of the 2007 AsiaBSDCon, Mar. 11, 2007, pp. 79-90.*
V. Devarapalli, R. Koodli, Review of draft-irtf-mobopts-location-privacy-solutions-06, Posting to the IETF Mobility Research Group Discussion Board, Nov. 6, 2007, pp. 2-4.*
M. Handley, C. Perking, E. Whelan, Session Announcement Protocol, Request for Comments 2974, pp. 1-18, Oct. 2000.*
D. Johnson, C. Perkins, J. Arkko, Mobility Support in IPv6, Jun. 2004, pp. 1-165.*
Koodli, R., IP Address Location Privacy and Mobile IPv6: Problem Statement, May 2007, pp. 1-12, Copyright—The IETF Trust.
Johnson, R., Perkins, C., and Arkko, J., Mobility Support in IPv6, Jun. 2004, pp. 1-165, Copyright—The Internet Society.
Arkko, J., Devarapalli, V., and Dupont, F., Using IPsec to Protect Mobile IPv6 Signaling Between Mobile Nodes and Home Agents, Jun. 2004, pp. 1-38, Copyright—The Internet Society.
Qiu, Y., Zhao, F., and Koodli, R., Mobile IPv6 Location Privacy Solutions draft-irtf-mobopts-location-privacy-solutions-09, Jul. 14, 2008, pp. 1-34, http:/tools.ietf.org/id/draft-irtf-mobopts-location-privacy-solutions-09.txt.

* cited by examiner

*Primary Examiner* — John Blanton
*Assistant Examiner* — Christopher Crutchfield (57) ABSTRACT

A method and apparatus for encrypting a home address of a mobile node, in which the mobile node implements a host-based mobility protocol during wireless communications with a home agent. The method includes applying an encryption algorithm on the home address to generate an encrypted home address, and placing the encrypted home address within a destination option of a payload packet. The payload packet is sent by the mobile node while away from a home network associated with the mobile node.

18 Claims, 4 Drawing Sheets

```
                                                              500
                                                         ┌───
        0                   1                   2                   3
        0 1 2 3 4 5 6 7 8 9 0 1 2 3 4 5 6 7 8 9 0 1 2 3 4 5 6 7 8 9 0 1
       +-+-+-+-+-+-+-+-+-+-+-+-+-+-+-+-+-+-+-+-+-+-+-+-+-+-+-+-+-+-+-+-+
       |   Type (TBD)  |     Length    | Prefix length |    Reserved   |
       +-+-+-+-+-+-+-+-+-+-+-+-+-+-+-+-+-+-+-+-+-+-+-+-+-+-+-+-+-+-+-+-+
       |                                                               |
       +                                                               +
       |                                                               |
       +                     Pseudo Home Address                       +
       |                                                               |
       +                                                               +
       |                                                               |
       +-+-+-+-+-+-+-+-+-+-+-+-+-+-+-+-+-+-+-+-+-+-+-+-+-+-+-+-+-+-+-+-+
```

METHOD AND APPARATUS FOR PROTECTING LOCATION PRIVACY OF A MOBILE DEVICE IN A WIRELESS COMMUNICATIONS NETWORK

CROSS-REFERENCE TO RELATED APPLICATIONS

This disclosure claims the benefit of U.S. Provisional Application No. 61/108,895, filed Oct. 28, 2008, which is incorporated herein by reference.

FIELD

The present disclosure generally relates to wireless networks.

BACKGROUND

Mobile IP (or IP mobility) is an Internet Engineering Task Force (IETF) standard communications protocol that is designed to allow mobile device users (or mobile nodes) to move from one network to another while maintaining a permanent IP address. Mobile IPv6 is a version of Mobile IP which enables a mobile node (MN) to maintain its connectivity to a packet data network (e.g., the Internet) during handover—e.g., when moving from one access network to another access network.

RFC 3775, "Mobile Support in IPv6" (which is incorporated herein by reference), describes techniques that enable a mobile node to remain reachable while the mobile node roams on the Internet. However, the location and movement of the mobile node can be revealed by IP addresses used in packets. IP address location privacy is concerned with unwittingly revealing the current location of a mobile node to eavesdroppers and to communicating parties. In the presence of mobility as defined in RFC 3775, there are two related aspects: disclosing the care-of address to a correspondent node (CN), and revealing the home address to an eavesdropper. A detailed description of the location privacy problem can be found in RFC 4882 (which is incorporated herein by reference).

In order to protect location privacy, a mobile node must not disclose the binding between its care-of address and its home address. Another issue related to IP address location privacy is "profiling", where the activities of a mobile node are linked and then analyzed. Profiled activities may contribute to compromising the location privacy of a mobile node, especially when combined with additional information. Furthermore, once location privacy is compromised, it may lead to more targeted profiling.

IRTF draft, "Mobile IPv6 Location Privacy Solutions", draft-irtf-mobopts-location-privacy-solutions-09, http://tools.ietf.org/id/draft-irtf-mobopts-location-privacy-solutions-09.txt, proposes some conventional location privacy solutions. The following is a list of key points:

1) A routable pseudo home address is as follows: pseudo home address=one of home network prefixes||Enc(Kph, interface ID), where Enc(.) can be either a block cipher or a stream cipher.

During the home binding update between the mobile node and the home agent with the IPsec transport mode, the binding update message appears as follows:

IPv6 header (source=care-of address, destination=home agent)
Destination option header
   Home Address option (pseudo home address)
ESP header in transport mode
Mobility header
   Home Binding Update
      Alternative Care-of Address option (care-of address)

The home agent replies to the mobile node with the Binding Acknowledgement (BA) which contains the pseudo home address in the Type 2 Routing Header.

2) The return routability procedure and the correspondent registration procedure are as follows.

Figure 1:
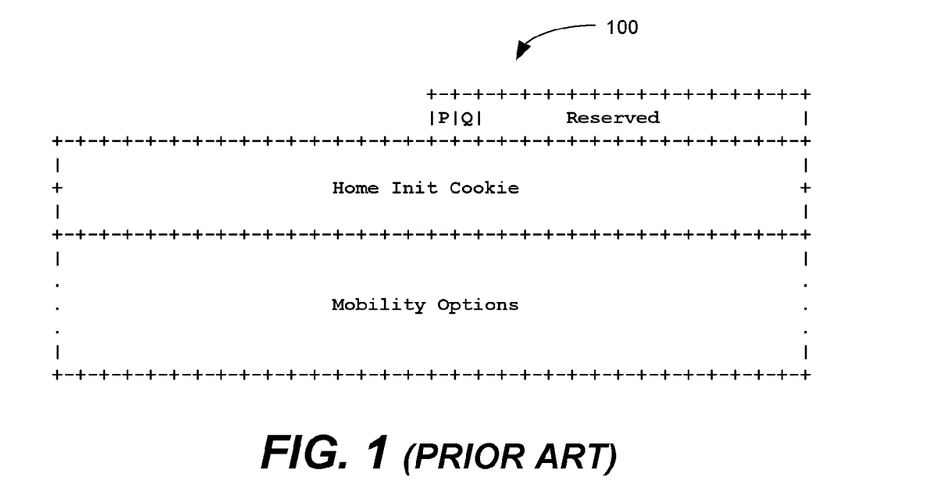
FIG. 1 illustrates a conventional Home Test Init (HoTI) message.

When initiating the communication with its correspondent node, the mobile node sends a Home Test Init (HoTI) message to its home agent in the following format:

IPv6 header (source=care-of address, destination=home agent)
ESP header in tunneling mode
IPv6 header (source=pseudo home address, destination=correspondent node)
Mobility header
   HoTI The mobile node sets a 'Q' bit in the reserved field of the HoTI message 100 shown in FIG. 1 to indicate that it uses a pseudo home address generated by cryptography in place of the home address. The home agent processes the received HoTI message in a similar way as described in RFC 3776 (which is incorporated herein by reference). The home agent derives the real home address by using the pseudo home address as a key to look up its binding cache and verify the SPD using the real home address as one of the selectors. Subsequently, the home agent forwards the HoTI message with pseudo home address as source IP address to the correspondent node.

The correspondent node processes this received HoTI message (using the pseudo home address as the value for the otherwise present home address) in the same way as described in RFC 3775 and sends the HoTI message addressed to the pseudo home address towards the home agent. If the 'Q' bit is set, the correspondent node sets a corresponding 'Q' bit in the HoTI message. This allows the home agent to determine that pseudo home address is present. Since the pseudo home address is routable, the HoTI message is forwarded to the home network and intercepted by the home agent. Upon reception, the home agent uses the pseudo home address as a key to look up its Binding Cache which returns the real home address of the mobile node. Then the home agent uses the corresponding security association to process and forward the HoTI message to the home address of the mobile node.

The care-of address test is exactly the same as specified in RFC 3775.

After receiving both HoTI and CoT messages, the mobile node first computes the binding management Kbm using the care-of keygen token and the home keygen token (which itself is computed using the pseudo home address). The Binding Update has an additional field: Enc(Kbm, invariant-pseudo-HoA), where invariant-pseudo-HoA is the very first pseudo home address used with the particular correspondent node. This is necessary because the pseudo home address keeps changing, and session continuity needs to be secured. In other words, the invariant address seen by the upper layer protocols at the correspondent node is invariant-pseudo-HoA at all times. The rest of the fields in the Binding Update is the same as described in RFC 3775.

Figure 2:
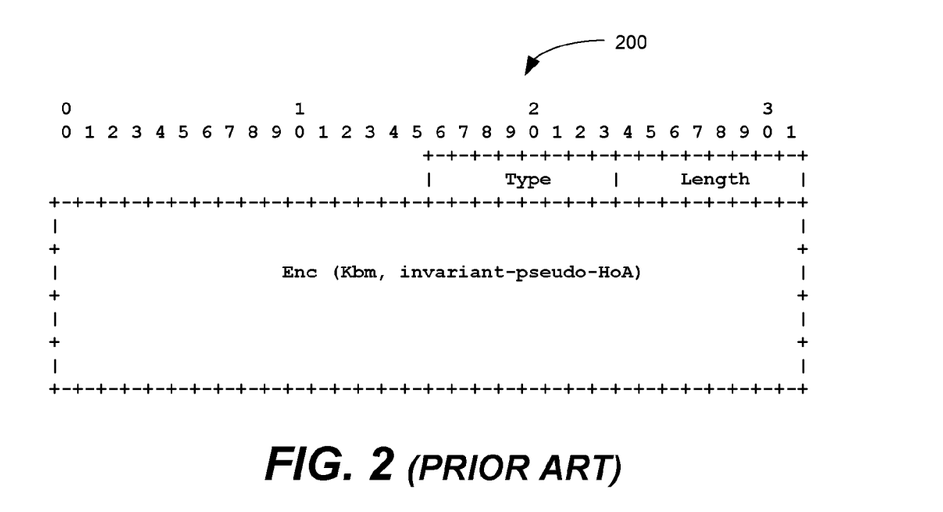
FIG. 2 illustrates a conventional Encrypted Invariant-Pseudo-HoA Option.

FIG. 2 illustrates an Encrypted invariant-pseudo-HoA option 200. After receiving the Binding Update, the correspondent node first computes the home keygen token and the care-of keygen token, then computes Kbm and verifies the MAC. If the MAC is valid, the correspondent node keeps the pseudo home address and the invariant-pseudo-HoA in the Binding Cache. The correspondent node then generates a Binding Acknowledgement and sends the Binding Acknowledgement back to the pseudo home address of the mobile node.

The subsequent data traffic between the mobile node and the correspondent node will follow the same procedure and the packet formats as specified in RFC 3775 except that the pseudo home address is used in place of the home address. And, equally importantly, the correspondent node presents the invariant-pseudo-HoA to the upper layers.

There are some flaws in the solutions above.

In 1) above, first, although the pseudo home address can be generated by concatenating one of home network prefixes and Enc(Kph, interface ID). However, there is no solution to inform the mobile node any new home network prefix that is different from the one used by the mobile node to form its home address. Second, the home network prefix is still in clear when used in the home registration procedure, therefore, eavesdroppers on the path between the mobile node and the home agent can profile activities based on the home network prefix and even identify the mobile node if the home network prefix is unique to each mobile node (this is the case when the link between the mobile node and the home agent is the point-to-point link). Third, in the binding update message, there is no any indication that a pseudo home address is used instead of the real home address, because the pseudo home address is carried in the home address destination option. Furthermore, the mobile node cannot inform the home agent that it wants to use the location privacy solution. On the other hand, in the binding acknowledgement sent back from the home agent to the mobile node, there is no indication in the Type 2 Routing Header showing that the home agent processes the binding update based on the pseudo home address; it is possible that the mobile node knows that by comparing the IP address in the Type 2 routing header with the previously used pseudo home address; however that is not good for packet processing. More importantly, there is no way for the home agent to tell the mobile node whether the home agent supports the location privacy solutions or not.

In 2) above, first, the pseudo home address is used as the source IP address in the inner header of the HoTi message sent from the mobile node to the home agent. However, this requires the changes of IPSec because the SPD entry is set up with the mobile node's real home address instead of the pseudo home address. Second, the Encrypted invariant-pseudo-HoA option is used to indicate the invariant-pseudo-HoA to the correspondent node and a different pseudo home address is used in the return routability procedure to generate a new home keygen token. This solution does not test the reachability of invariant-pseudo-HoA, which results in new vulnerabilities, for example, eavesdroppers can intercept the traffic to a mobile node.

SUMMARY

In general, this specification describes, inter alia, the following techniques and mechanisms. In one aspect, this specification discloses a new Encrypted Home Address Destination Option, which can be used during the home binding update procedure and other signaling procedures between the home agent and the mobile node, the reverse-tunneled correspondent Binding Update procedure, the payload packets exchanged with the correspondent node via the optimized route and the reverse-tunneled payload packets, to carry the encrypted home address, and a new 'E' bit allocated in the Type 2 Routing Header, which can be used during the home binding update procedure and other signaling procedures between the home agent and the mobile node, the reverse-tunneled correspondent Binding Update procedure, the payload packets exchanged with the correspondent node via the optimized route and the reverse-tunneled payload packets, to indicate that an encrypted home address is carried. The encrypted home address is generated by applying an encryption algorithm on the entire home address.

In another aspect, this specification discloses a Pseudo Home Address Mobility Option and a Pseudo Home Address Acknowledgement Mobility Option. Such options can be used for a mobile node to register multiple pseudo home addresses with a home agent during the home registration and also obtain a home keygen token based on a pseudo home address during the home address test procedure with a correspondent node.

In general, in one aspect, this specification describes a method and apparatus for encrypting a home address of a mobile node, in which the mobile node implements a host-based mobility protocol during wireless communications with a home agent. The method includes applying an encryption algorithm on the home address to generate an encrypted home address, and placing the encrypted home address within a destination option of a payload packet. The payload packet is sent by the mobile node while away from a home network associated with the mobile node.

DETAILED DESCRIPTION

Encrypted Home Address Destination Option

Figure 3:
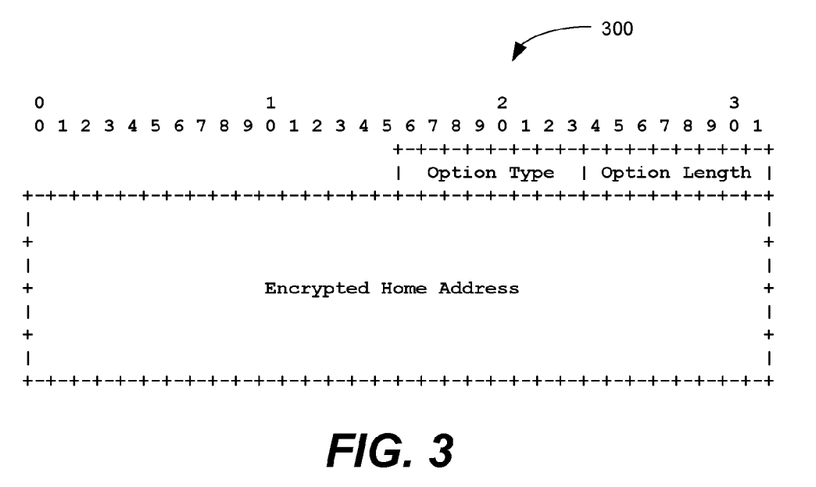
FIG. 3 illustrates an example format of an Encrypted Home Address Destination Option.

FIG. 3 illustrates an example format 300 of an Encrypted Home Address Destination Option. The format 300 includes the following fields: Option Type—a unique type for identifying the use of the encrypted home address (e.g., to be determined by IANA (Internet Assigned Numbers Authority); Encrypted Home Address—in one implementation, the encrypted home address is generated from either a real or pseudo home address. Other fields and processing of the Encrypted Home Address Destination Option are the same as that of the Home Address option described in RFC 3775.

The Encrypted Home Address option can be used during the home binding update procedure and other signaling procedures between the home agent and the mobile node, the reverse-tunneled correspondent Binding Update procedure, the payload packets exchanged with the correspondent node via the optimized route and the reverse-tunneled payload packets. Note that if the Encrypted Home Address option is present in a data packet, (in one implementation) the encrypted home address therein must not be treated as the real source IP address by the receiver.

Extensions to the Type 2 Routing Header

Figure 4:
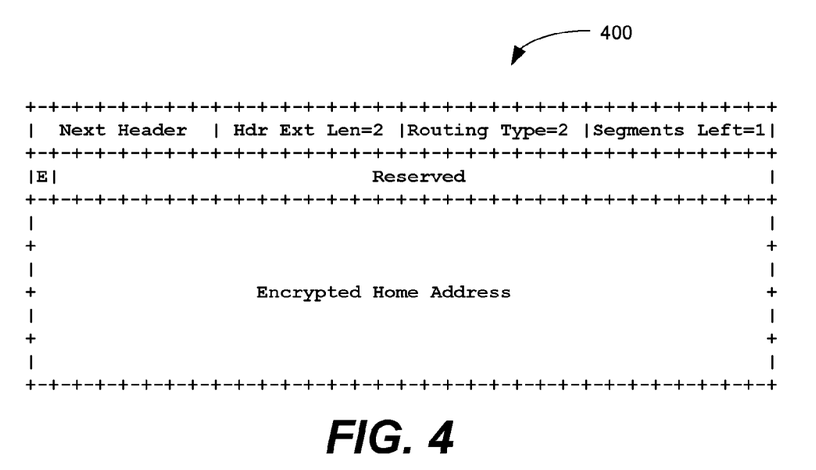
FIG. 4 illustrates an example format of a Type 2 Routing Header.

FIG. 4 illustrates an example format 400 of a Type 2 Routing Header. A new bit in the reserved field of the Type 2 Routing Header is used to indicate that the encrypted home address is carried in the routing header. The format 400 includes the following fields: Encrypted Home Address (E)— the Encrypted Home Address (E) bit is set to indicate that the encrypted home address is carried in the routing header; Encrypted Home Address—the encrypted home address generated from either a real or pseudo home address.

Other fields and processing of the new type of routing header are the same as that of the type 2 routing header described in RFC 3775. The extended type 2 routing header can be used during the home binding update procedure and other signaling procedures between the home agent and the mobile node, the reverse-tunneled correspondent Binding Update procedure, the payload packets exchanged with the correspondent node via the optimized route and the reverse-tunneled payload packets. Note that if the type 2 routing header with the 'E' set is present in a data packet, (in one implementation) the encrypted home address therein must not be treated as the real destination IP address by the receiver.

Pseudo Home Address

To protect location privacy in the route optimization mode, the mobile node replaces the real home address used in the signaling and payload messages with the pseudo home address. Different from the encrypted home address, the pseudo home address is routable so that the home agent can intercept packets using such pseudo home address as the destination address. Therefore, (in one implementation) the pseudo home address is generated by concatenating one of the home network prefixes with a random bit string. There are many ways to generate such random bit string, for example, by using a random number generator or a secure encryption or hash algorithm, which prevents eavesdroppers from revealing the real home address. In one implementation, the home network prefix used to form the pseudo home address is managed by the same home agent; however, the home network prefix does not have to be the same as that assigned to the mobile node. Therefore, such pseudo home address ensures that, when used in the home address test messages, the same route path between the home agent and the correspondent node is traversed as when the real home address is used.

In one implementation, the mobile node registers the pseudo home address to be used with the home agent before actually using the pseudo home address. To do so, the mobile node includes the pseudo home address in one Pseudo Home Address mobility option in the Binding Update message sent to the home agent. If the home agent supports the location privacy solution, the home agent performs the Duplicate Address Detection to detect whether this pseudo home address conflicts with other pseudo home addresses submitted from different mobile nodes. Based on whether there is conflict, the home agent sets up the appropriate status code in the Pseudo Home Address Acknowledgement option in the Binding Acknowledgement message to indicate whether to accept the pseudo home address. If the home agent prefers the use of a different home network prefix for the requested pseudo home address, the home agent returns the new pseudo home address in the Pseudo Home Address Acknowledgement Mobility option to the mobile node.

The mobile node may register the pseudo home address when the mobile node is about to communicate with a correspondent node with location privacy protection. In order to save message overhead, the mobile node may register multiple pseudo home addresses in one Binding Update message. The lifetime of registered pseudo home addresses can be the same as the Home Binding Cache entry. The mobile node can add or delete any pseudo home address by using the Pseudo Home Address mobility option in the Home Binding Update message. The home agent cannot and do not attempt to recover the real home address from such pseudo home address.

Pseudo Home Address Mobility Option

Figure 5:
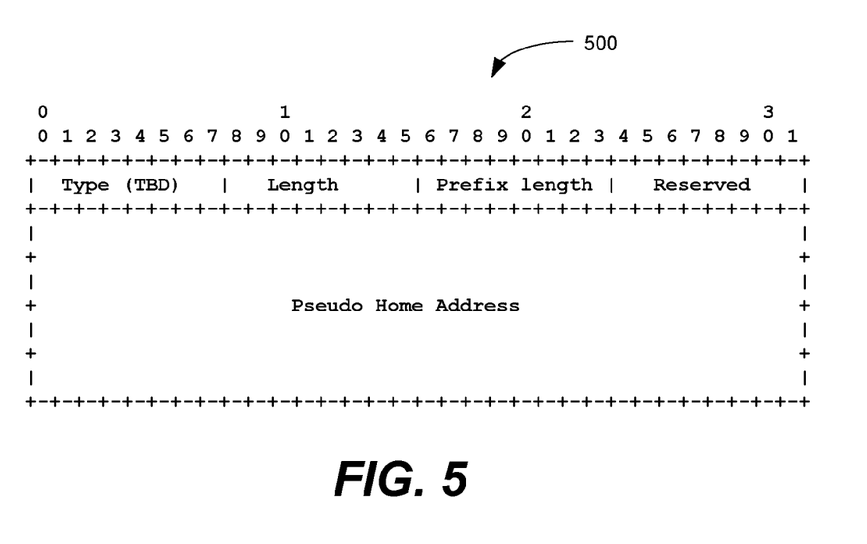
FIG. 5 illustrates an example format of a Pseudo Home Address Mobility Option.

The Pseudo Home Address mobility option is included in the mobility header, including the Binding Update message and the Home Test Init (HoTI) message sent to the home agent. The alignment requirement for this option is 4n. FIG. 5 illustrates an example format 500 of a Pseudo Home Address Mobility Option. The format 500 includes the following fields: Type—a unique type for identifying the Pseudo Home Address mobility option (e.g., to be determined by IANA); Length—the length of the Pseudo Home Address mobility option excluding the Type field and the Length field. The length field can be set to zero when the Pseudo Home Address field is not present; otherwise, the length field can be set to 18.

Additional fields within the format 500 include: Prefix Length—The length of the home network prefix of the included pseudo home address. When the pseudo home address field is not present, the Prefix Length can be set as zero; Reserved—This field is reserved for future use. The reserved field can be set to zero by the sender and ignored by the receiver; Pseudo Home Address—if present, the field contains a pseudo home address that the mobile node wants to use for location privacy protection or zero if the mobile node requests a pseudo home address from the home agent. This field is not present, if the mobile node only intends to discover whether the home agent supports location privacy solutions. The Length field is used to detect whether the Pseudo Home Address field is present in the Pseudo Home Address mobility option. The Pseudo Home Address mobility option is valid in the Home Binding Update message, and the Home Test Init message, and carries zero or one pseudo home address.

Pseudo Home Address Acknowledgement Mobility Option

The Pseudo Home Address Acknowledgement mobility option is included in the mobility header, including the Binding Acknowledgement message and the Home Test message sent to the mobile node. This mobility option is used to indicate either whether a pseudo home address has been allocated to the mobile node, if requested, and/or registered, or whether the home agent supports the location privacy solutions. The alignment requirement for this option is 2n.

Figure 6:
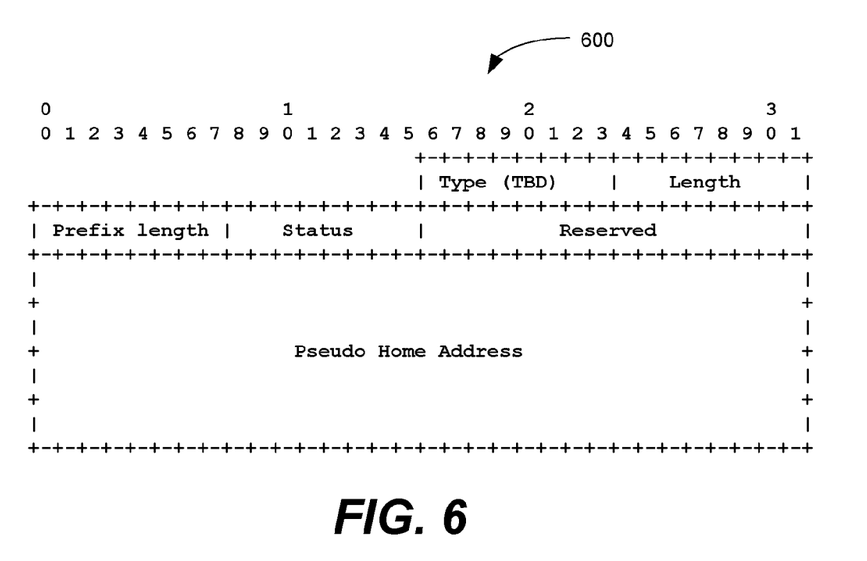
FIG. 6 illustrates an example format of a Pseudo Home Address Acknowledgement Mobility Option.

FIG. 6 illustrates an example format 600 of a Pseudo Home Address Acknowledgement Mobility Option. The format 600 includes the following fields: Type—a unique type for identifying the Pseudo Home Address Acknowledgement mobility option (e.g., to be determined by IANA); Length—The length field corresponds to the length of the Pseudo Home Address Acknowledgement mobility option excluding the Type field and the Length field. The length can be zero when the Pseudo Home Address field is not present; otherwise, the length can be 20; Prefix Length—The prefix length field corresponds to the length of the home network prefix of the included pseudo home address. When the pseudo home address field is not present, the Prefix Length can be set as zero.

The format 600 further includes a Status field that indicates the status of requesting the use of the pseudo home address. In one implementation, values from 0 to 127 are used to indicate success, and higher values are used to indicate failure. For example, in one implementation, the following values for the status field are reserved: 0—Success; 1—Success but use the suggested pseudo home address; 128—Failure; reason unspecified; 129—Administratively prohibited; 130—Incorrect pseudo home address; 131—Invalid pseudo home address; 132—Dynamic pseudo home address assignment not available.

The format 600 additionally includes the following fields: Reserved—This field is reserved for future use. The reserved field can be set to zero by the sender and ignored by the receiver; Pseudo Home Address—if present, the field contains a pseudo home address that the home agent registers for the mobile node to use for location privacy protection. This field is not present, if the home agent indicates that it supports location privacy solutions as a response to the query from the mobile node. The Length field is used to detect whether the Pseudo Home Address field is present in the Pseudo Home Address Acknowledgement mobility option. The Pseudo Home Address Acknowledgement mobility option is valid in the Home Binding Acknowledgement message, and the Home Test message, and carries zero or one pseudo home address.

Procedure of Home Registration with IPSec Transport Mode

In one implementation, the format of the modified Home Binding Update message when the IPsec ESP transport mode is used is shown as follows.

IPv6 header (source=care-of address, destination=home agent)
    Destination option header
    Encrypted Home Address option (encrypted home address)
    ESP header in transport mode
    Mobility header
    Home Binding Update
    Alternative Care-of Address option (care-of address)
    Pseudo Home Address option (pseudo home address)

In order to receive the response, including the indication of location privacy support, from the home agent, the mobile node can set the Acknowledgement (A) bit in the Binding Update. The format of the modified Home Binding Acknowledgement message when the IPSec ESP transport mode is used is shown as follows.

IPv6 header (source=home agent, destination=care-of address)
    Routing header with the 'E' bit set
    encrypted home address
    ESP header in transport mode
    Mobility header
    Binding Acknowledgement The Return Routability Procedure with the Pseudo Home Address The location privacy solution specified in this disclosure does not introduce any change to the care-of address test procedure as specified in RFC 3775. In the following, we highlight the extensions to the home address test procedure, during which the mobile node obtains a home keygen token generated based on the pseudo home address.

The mobile node generates and sends a Home Test Init message to the home agent. The format of such message is shown as follows.

IPv6 header (source=care-of address, destination=home agent)
    ESP header in tunnel mode
    IPv6 header (source=home address, destination=correspondent)
    Mobility Header (HoTI)
    Home Init Cookie
    Pseudo Home Address Mobility Option (pseudo home address)

The difference from what is specified in RFC 3775 is that the mobile node includes a Pseudo Home Address mobility option in the Home Test Init message. The pseudo home address contained in the Pseudo Home Address option is selected by the mobile node from a set of pseudo home addresses that have been registered with the home agent during the home registration procedure. Note that the Home Test Init message is protected by an IPSec security association in the ESP tunnel mode with a non-null encryption algorithm and a non-null authentication algorithm, as specified in RFC 3776. When receiving a Home Test Init message, the home agent performs certain operation. If such operation succeeds when the Pseudo Home Address mobility option is present in the Home Test Init message, the home agent generates a Home Test Init message and forwards the message to the correspondent node. As shown in the following, the pseudo home address carried in the Pseudo Home Address mobility option is used as the source IP address in the forwarded Home Test Init message.

IPv6 header (source=pseudo home address, destination=correspondent)
    Mobility Header (HoTI)
    Home Init Cookie The forwarded Home Test Init message looks the same to the correspondent node as what is specified in RFC 3775 and the correspondent node does not realize that the pseudo home address is used, and just generates a home keygen token using the same algorithm as specified in RFC 3775.

home keygen token:=
    First (64, HMAC_SHA1 (Kcn, (pseudo home address|nonce|0)))

The correspondent node then replies with a Home Test message. As shown in the following, the format of such Home Test message is the same as that specified in RFC 3776 and the pseudo home address is used as the destination IP address.

IPv6 header (source=correspondent, destination=pseudo home address)
    Mobility Header (HoT)
    Home Init Cookie
    Home Keygen Token
    Home Nonce Index When the home agent intercepts such Home Test message using proxy Neighbor Discovery, the home agent performs a certain operation. If such operation succeeds, the home agent generates the following Home Test message and forwards to the mobile node.

IPv6 header (source=home agent, destination=care-of address)
    ESP header in tunnel mode
    IPv6 header (source=correspondent, destination=home address)
    Mobility Header (HoT)
    Home Init Cookie
    Home Keygen Token
    Home Nonce Index Pseudo Home Address Acknowledgement Mobility Option (pseudo home address)

When the mobile node receives the Home Test message, the mobile node performs a certain operation. If such operation succeeds, the mobile node obtains a home keygen token computed using the pseudo home address. After the care-of address test is completed, the mobile node hashes the care-of keygen token and the home keygen token together to generate Kbm using the method specified in RFC 3775.

Reverse-Tunneled Correspondent Binding Update

The Encrypted Home Address option and the extended Type 2 routing header can also be used during the reverse-tunneled correspondent Binding Update procedure, the payload packets exchanged with the correspondent node via the optimized route and the reverse-tunneled payload packets. The mobile node generates a correspondent binding update and reverse-tunnels such message to the correspondent node via the home agent. The format of such packet after encapsulation is shown as follows. Note that the encrypted home address is carried in the Encrypted Home Address option.

IPv6 header (source=care-of address, destination=home agent)
    ESP header in tunnel mode
    IPv6 header (source=home address, destination=correspondent node)
    Destination option header
    Encrypted Home Address option (encrypted home address)
    Parameters:
    Alternative Care-of Address option (care-of address)
    sequence number (within the Binding Update message header)
    home nonce index (within the Nonce Indices option)
    care-of nonce index (within the Nonce Indices option)
    First (96, HMAC_SHA1 (Kbm, (care-of address|correspondent|BU)))

This packet is protected by the IPsec security association with a non-null encryption algorithm, for example, the same security association used for protecting other bi-directionally tunneled payload packets. If the home agent can process this packet successfully, the home agent forwards the following packet to the correspondent node.

IPv6 header (source=home address, destination=correspondent node)
    Destination option header
    Encrypted Home Address option (encrypted home address)
    Parameters:
    Alternative Care-of Address option (care-of address)
    sequence number (within the Binding Update message header)
    home nonce index (within the Nonce Indices option)
    care-of nonce index (within the Nonce Indices option)
    First (96, HMAC_SHA1 (Kbm, (care-of address|correspondent|BU)))

If such correspondent binding update is processed successfully and an acknowledgement is requested, the correspondent node constructs a binding acknowledgement shown as follows.

IPv6 header (source=correspondent node, destination=home address)
    Type 2 Routing header with the 'E' bit set
    encrypted home address
    Parameters:
    Alternative Care-of Address option (care-of address)
    sequence number (within the Binding Update message header)
    First (96, HMAC_SHA1 (Kbm, (care-of address|correspondent|BA)))

Once receiving this binding acknowledgement, the home agent applies the IPsec security association with a non-null encryption algorithm to the message and forwards the following packet to the mobile node.

IPv6 header (source=home agent, destination=care-of address)
    ESP header in tunnel mode
    IPv6 header (source=correspondent node, destination=home address)
    Type 2 Routing header with the 'E' bit set
    encrypted home address
    Parameters:
    Alternative Care-of Address option (care-of address)
    sequence number (within the Binding Update message header)
    First (96, HMAC_SHA1 (Kbm, (care-of address|correspondent|BA)))

The reverse-tunneled correspondent registration procedure is completed after the mobile node processes the received binding acknowledgement.

To delete an established binding cache entry at the correspondent node, the mobile node reverse-tunnels the following binding update message via the home agent. Note that the Encrypted Home Address option is optional in the correspondent binding de-registration and only the home keygen token is used to generate Kbm and Kpm, if needed, in this case.

IPv6 header (source=care-of address, destination=home agent)
    ESP header in tunnel mode
    IPv6 header (source=home address, destination=correspondent node)
    Destination option header (optional)
    Encrypted Home Address option (encrypted home address)
    Parameters:
    Alternative Care-of Address option (care-of address)
    sequence number (within the Binding Update message header)
    home nonce index (within the Nonce Indices option)
    care-of nonce index (within the Nonce Indices option)
    First (96, HMAC_SHA1 (Kbm, (care-of address|correspondent|BU)))

If an acknowledgement is requested, the correspondent node returns the following binding acknowledgement to the mobile node. Such message is received and forwarded by the home agent to the mobile node.

IPv6 header (source=correspondent node, destination=home address)
    Type 2 Routing header with the 'E' bit set (optional)
    encrypted home address
    Parameters:
    Alternative Care-of Address option (care-of address)
    sequence number (within the Binding Update message header)
    First (96, HMAC_SHA1 (Kbm, (care-of address|correspondent|BA)))

Payload Packets Via the Optimized Route after the Reverse-Tunnel Correspondent Binding Update After the correspondent registration is completed successfully, subsequent payload packets are exchanged via the optimized route between the mobile node and the correspondent node. In such packets, only the encrypted home address carried in the Encrypted Home Address destination option and the type 2 routing header is visible to eavesdroppers. The format of payload packets sent from the mobile node to the correspondent node is shown as follows.

IPv6 header (source=care-of address, destination=correspondent node)
    Destination option header
    Encrypted Home Address option (encrypted home address)
    Payloads The format of payload packets sent from the correspondent node to the mobile node is shown as follows.

IPv6 header (source=correspondent node, destination=care-of address)
    Type 2 Routing header with the 'E' bit set
    encrypted home address
    Payloads One or more of the procedure steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 7:
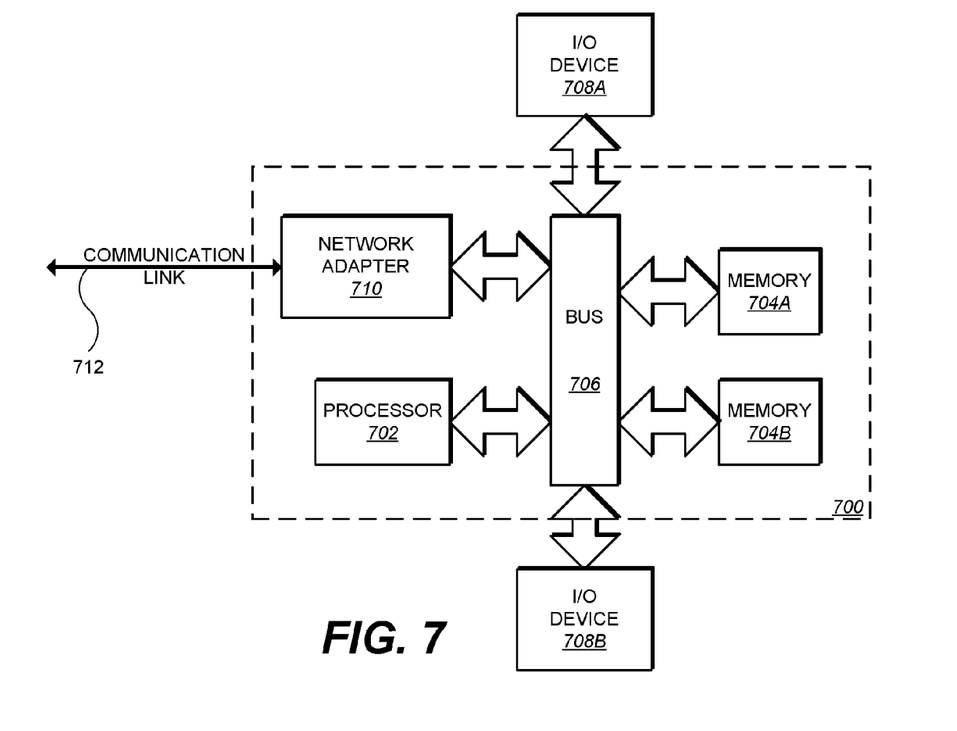
FIG. 7 is a block diagram of a data processing system (e.g., a mobile node) suitable for storing and/or executing program code.

FIG. 7 illustrates a data processing system 700 (e.g., a mobile node) suitable for storing and/or executing program code. Data processing system 700 includes a processor 702 coupled to memory elements 704A-B through a system bus 706. In other implementations, data processing system 700 includes more than one processor and each processor can be coupled directly or indirectly to one or more memory elements through a system bus. Memory elements 704A-B can include local memory employed during actual execution of the program code, bulk storage, and cache memories that provide temporary storage of at least some program code in order to reduce the number of times the code must be retrieved from bulk storage during execution. As shown, input/output or I/O devices 708A-B (including, but not limited to, keyboards, displays, pointing devices, etc.) are coupled to data processing system 700. I/O devices 708A-B may be coupled to data processing system 700 directly or indirectly through intervening I/O controllers (not shown).

In one implementation, a network adapter 710 is coupled to data processing system 700 to enable data processing system 700 to become coupled to other data processing systems or remote printers or storage devices through communication link 712. Communication link 712 can be a private or public network. Modems, cable modems, and Ethernet cards are just a few of the currently available types of network adapters.

Although the subject matter has been described in language specific to structural features and/or operations, the subject matter defined in the claims is not necessarily limited to the specific features or operations described above, including the order in which the operations are performed.

What is claimed is:

1. A method comprising:
transmitting, by a mobile node to a home agent, a first request to discover if the home agent supports location privacy solutions associated with concealing location information or movement information of the mobile node from eavesdroppers, wherein the first request comprises a first pseudo home address mobility option of a first payload packet, wherein the first pseudo home address mobility option of the first payload packet does not include any pseudo home address, wherein the first pseudo home address mobility option of the first payload packet comprises a first length field that is set to zero based on the first pseudo home address mobility option of the first payload packet not including any pseudo home address, and wherein the mobile node implements a host-based mobility protocol during wireless communications with the home agent; and
in response to transmitting the first request, receiving, by the mobile node from the home agent, a first acknowledgement acknowledging that the home agent supports location privacy solution, wherein the first acknowledgement comprises a first pseudo home address acknowledgement mobility option, wherein the first pseudo home address acknowledgement mobility option does not include any pseudo home address, and wherein the first pseudo home address acknowledgement mobility option comprises a second length field that is set to zero based on the first pseudo home address acknowledgement mobility option not including any pseudo home address.

2. The method of claim 1, wherein the first length field is an indication of a length of the first pseudo home address mobility option without (i) the first length field and (i) a type field, wherein the first length field provides an indication that the first pseudo home address mobility option does not include any pseudo home address.

3. The method of claim 1, wherein the second length field is an indication of a length of the first pseudo home address acknowledgement mobility option without (i) the second length field and (i) a type field, wherein the second length field provides an indication that the first pseudo home address acknowledgement mobility option does not include any pseudo home address.

4. The method of claim 1, further comprising:
in response to receiving the first acknowledgement acknowledging that the home agent supports location privacy solution, generating, by the mobile node, a first pseudo home address by concatenating a home network prefix with a bit string;
transmitting, by the mobile node to the home agent, a second request to register the first pseudo home address, wherein the second request comprises a second pseudo home address mobility option of a second payload packet, wherein the second pseudo home address mobility option of the second payload packet includes (i) the first pseudo home address and (ii) a third length field that is set to a non-zero value based on the second pseudo home address mobility option of the second payload packet including the first pseudo home address; and
in response to transmitting the second request, receiving, by the mobile node from the home agent, a second pseudo home address acknowledgement mobility option, wherein the second pseudo home address acknowledgement mobility option comprises one of
- (A) an indication of successfully registering the first pseudo home address, or
- (B) (i) an indication of a failure to register the first pseudo home address and (ii) a second pseudo home address that was registered for the mobile node by the home agent.

5. The method of claim 4, wherein:
the home network prefix is a first home network prefix; and
the first home network prefix is different from a second hoe network prefix that was previously assigned to the mobile node.

6. The method of claim 5, wherein the first home network prefix was not previously assigned to the mobile node.

7. The method of claim 4, further comprising:
encrypting the first pseudo home address to generate an encrypted pseudo home address,
wherein the second pseudo home address mobility option of the second payload packet includes the encrypted first pseudo home address.

8. The method of claim 7, wherein the second request comprises an encryption field that indicates that the encrypted pseudo home address included in the second request is encrypted.

9. The method of claim 4, wherein the bit string comprises one of (i) random bits, (ii) bits generated using an encryption algorithm, and (iii) bits generated using a hash algorithm.

10. An apparatus comprising:
a processor; and
a computer-readable storage medium, wherein instructions are tangibly stored on the computer-readable storage medium, wherein the instructions are executable by the processor to enable the processor to
transmit, to a home agent, a first request to discover if the home agent supports location privacy solutions associated with concealing location information or movement information of the mobile node from eavesdroppers, wherein the first request comprises a first pseudo home address mobility option of a first payload packet, wherein the first pseudo home address mobility option of the first payload packet does not include any pseudo home address, wherein the first pseudo home address mobility option of the first payload packet comprises a first length field that is set to zero based on the first pseudo home address mobility option of the first payload packet not including any pseudo home address, and wherein the apparatus implements a host-based mobility protocol during wireless communications with the home agent, and
in response to transmitting the first request, receive, from the home agent, a first acknowledgement acknowledging that the home agent supports location privacy solution, wherein the first acknowledgement comprises a first pseudo home address acknowledgement mobility option, wherein the first pseudo home address acknowledgement mobility option does not include any pseudo home address, and wherein the first pseudo home address acknowledgement mobility option comprises a second length field that is set to zero based on the first pseudo home address acknowledgement mobility option not including any pseudo home address.

11. The apparatus of claim 10, wherein the first length field is an indication of a length of the first pseudo home address mobility option without (i) the first length field and (i) a type field, wherein the first length field provides an indication that the first pseudo home address mobility option does not include any pseudo home address.

12. The apparatus of claim 10, wherein the second length field is an indication of a length of the first pseudo home address acknowledgement mobility option without (i) the second length field and (i) a type field, wherein the second length field provides an indication that the first pseudo home address acknowledgement mobility option does not include any pseudo home address.

13. The apparatus of claim 10, wherein the instructions are executable by the processor to further enable the processor to:
in response to receiving the first acknowledgement acknowledging that the home agent supports location privacy solution, generate a first pseudo home address by concatenating a home network prefix with a bit string;
transmit, to the home agent, a second request to register the first pseudo home address, wherein the second request comprises a second pseudo home address mobility option of a second payload packet, wherein the second pseudo home address mobility option of the second payload packet includes (i) the first pseudo home address and (ii) a third length field that is set to a non-zero value based on the second pseudo home address mobility option of the second payload packet including the first pseudo home address; and
in response to transmitting the second request, receiving, by the mobile node from the home agent, a second pseudo home address acknowledgement mobility option, wherein the second pseudo home address acknowledgement mobility option comprises one of
- (A) an indication of successfully registering the first pseudo home address, or
- (B) (i) an indication of a failure to register the first pseudo home address and (ii) a second pseudo home address that was registered for the mobile node by the home agent.

14. The apparatus of claim 13, wherein:
the home network prefix is a first home network prefix; and
the first home network prefix is different from a second hoe network prefix that was previously assigned to the mobile node.

15. The apparatus of claim 14, wherein the first home network prefix was not previously assigned to the mobile node.

16. The apparatus of claim 13, wherein the instructions are executable by the processor to further enable the processor to:
encrypt the first pseudo home address to generate an encrypted pseudo home address,
wherein the second pseudo home address mobility option of the second payload packet includes the encrypted first pseudo home address.

17. The apparatus of claim 16, wherein the second request comprises an encryption field that indicates that the encrypted pseudo home address included in the second request is encrypted.

18. The apparatus of claim 13, wherein the bit string comprises one of (i) random bits, (ii) bits generated using an encryption algorithm, and (iii) bits generated using a hash algorithm.

* * * * *